United States Patent
Zhong et al.

(10) Patent No.: US 11,934,089 B2
(45) Date of Patent: Mar. 19, 2024

(54) BIDIRECTIONAL COMPENSATION METHOD AND APPARATUS FOR PROJECTION THERMAL DEFOCUSING, AND READABLE STORAGE MEDIUM

(71) Applicant: CHENGDU XGIMI TECHNOLOGY CO., LTD., Sichuan (CN)

(72) Inventors: Bo Zhong, Sichuan (CN); Shi Xiao, Sichuan (CN); Xin Wang, Sichuan (CN); Zhong Ning, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/788,754

(22) PCT Filed: Mar. 13, 2020

(86) PCT No.: PCT/CN2020/079212
§ 371 (c)(1),
(2) Date: Jun. 24, 2022

(87) PCT Pub. No.: WO2021/128600
PCT Pub. Date: Jul. 1, 2021

(65) Prior Publication Data
US 2023/0033152 A1 Feb. 2, 2023

(30) Foreign Application Priority Data
Dec. 27, 2019 (CN) .......................... 201911378295.5

(51) Int. Cl.
*G03B 21/53* (2006.01)
*H04N 9/31* (2006.01)

(52) U.S. Cl.
CPC ............. *G03B 21/53* (2013.01); *H04N 9/317* (2013.01)

(58) Field of Classification Search
CPC ...... H04N 9/315; H04N 9/317; H04N 9/3152; H04N 9/3155; H04N 9/3185;
(Continued)

(56) References Cited

U.S. PATENT DOCUMENTS

2012/0050577 A1* 3/2012 Hongu .................. G02B 7/102
348/240.1
2012/0281130 A1* 11/2012 Kudo ................... H04N 25/704
348/E5.022
(Continued)

FOREIGN PATENT DOCUMENTS

CN 103150712 A 6/2013
CN 106896466 A 6/2017
(Continued)

OTHER PUBLICATIONS

First OA of corresponding JP application No. 2022-538424 dated Aug. 15, 2023.

*Primary Examiner* — Sultan Chowdhury
(74) *Attorney, Agent, or Firm* — Gang Yu

(57) ABSTRACT

The present disclosure relates to the technical field of compensation for projection thermal defocusing, and the embodiments specifically disclose a bidirectional compensation method and apparatus for projection thermal defocusing, and a readable storage medium. The bidirectional compensation method for projection thermal defocusing provided in the present disclosure comprises determining whether to proceed to a definition value determination step according to whether a similarity value of two latest projected picture images satisfies a preset similarity value requirement; by means of the method of proceeding to first-direction thermal defocusing compensation or second-direction thermal defocusing compensation by comparing the magnitude of definition values of the latest two projected picture images, non-perception compensation for projection (Continued)

thermal defocusing is achieved, without using a specified compensation direction and a specific focusing map, and a compensation effect is achieved by means of real-time analysis of projected pictures, the operation being convenient and suitable for widespread popularization.

10 Claims, 6 Drawing Sheets

(58) Field of Classification Search
CPC ...... H04N 9/3188; G03B 21/43; G03B 21/53; G03B 21/142; G03B 21/145; G03B 21/208; G03B 21/2046; G03B 21/2053; G03B 13/26; G03B 13/32; G03B 13/34; G03B 13/36

See application file for complete search history.

(56) References Cited

U.S. PATENT DOCUMENTS

| | | | | |
|---|---|---|---|---|
| 2012/0307134 | A1* | 12/2012 | Morimoto | H04N 23/663 348/360 |
| 2015/0103257 | A1* | 4/2015 | Nakashin | H04N 9/3194 348/746 |
| 2018/0217352 | A1* | 8/2018 | Kamba | G02B 7/09 |

FOREIGN PATENT DOCUMENTS

| | | |
|---|---|---|
| CN | 106934806 A | 7/2017 |
| CN | 107229176 A | 10/2017 |
| CN | 107343184 A | 11/2017 |
| CN | 107682681 A | 2/2018 |
| CN | 107911678 A | 4/2018 |
| CN | 108781267 A | 11/2018 |
| CN | 109151328 A | 1/2019 |
| CN | 109510936 A | 3/2019 |
| CN | 110418123 A | 11/2019 |
| JP | 20050037774 A | 2/2005 |
| JP | 2005143043 A | 6/2005 |
| JP | 2011248185 A | 12/2011 |
| JP | 2012008522 A | 1/2012 |
| JP | 2015096880 A | 5/2015 |
| JP | 2017173468 A | 9/2017 |
| WO | 2019173954 A1 | 9/2019 |

* cited by examiner

BIDIRECTIONAL COMPENSATION METHOD AND APPARATUS FOR PROJECTION THERMAL DEFOCUSING, AND READABLE STORAGE MEDIUM

TECHNICAL FIELD

The present disclosure relates to the technical field of compensation for projection thermal defocusing, and in particular, to a bidirectional compensation method and apparatus for projection thermal defocusing, and a readable storage medium.

BACKGROUND

In the related art, the projection thermal defocusing solution, the effect of defocusing compensation is achieved by a projection focusing solution, that is, a focusing map is projected to determine a definition, and refocusing is performed once; in another solution, by means of a default compensation direction, a compensation effect is achieved by driving a motor to move in a fixed direction according to a time axis or a temperature. Solution I provides a poor experience to a user, and solution II cannot take into consideration of both the circumstance temperature and structure difference of a device, which may lead to a worse compensation effect.

SUMMARY

A technical solution provided by some embodiments of the present disclosure is a bidirectional compensation method for projection thermal defocusing, comprising:

S11: projected picture images is acquired;

S12: a motor is driven to rotate in a first direction by a preset number of steps, and then a projected picture image is acquired again;

S13: it is determined whether a similarity value between a current projected picture image and a previous projected picture image satisfies a preset similarity value requirement, if not, S11 is returned, and if so, S14 is proceeded;

S14: definition values of the current projected picture image and a definition value of the previous projected picture image are calculated, and first-direction thermal defocusing compensation or second-direction thermal defocusing compensation is performed according to a comparison result of two definition values which comprises a definition value of the current projected picture image and a definition value of the previous projected picture image.

Alternatively, the method of S11 comprises:

S111: two projected picture images are continuously acquired; and

S112: it is determined whether a similarity value between the two projected picture images satisfies a preset similarity value requirement, if so, S12 is proceeded, and if not, S111 is returned.

Alternatively, the method of S14 comprises:

S141: the definition value of the current projected picture image and the definition value of the previous projected picture image is calculated;

S142: it is determined whether the definition value of the current projected picture image is greater than or equal to the definition value of the previous projected picture image, if so, proceeding to S143, and if not, proceeding to S144;

S143: first-direction thermal defocusing compensation is performed: driving the motor to rotate in the first direction by a preset number of steps, and then acquiring a projected picture image again, calculating a definition value of the current projected picture image and a definition value of the previous projected picture image, and determining whether the definition value of the current projected picture image is greater than or equal to the definition value of the previous projected picture image, if so, returning to the step of driving the motor to rotate in the first direction by a preset number of steps, and then acquiring a projected picture image again to start re-execution, until the definition value of the current projected picture image is less than the definition value of the previous projected picture image, and then driving the motor to move in a second direction by a preset number of steps, so as to complete thermal defocusing compensation; and S144: second-direction thermal defocusing compensation is performed: driving the motor to rotate in the second direction by a preset number of steps, and then acquiring a projected picture image again, calculating a definition value of the current projected picture image and a definition value of the previous projected picture image, and determining whether the definition value of the current projected picture image is greater than or equal to the definition value of the previous projected picture image, if so, returning to the step of driving the motor to rotate in the second direction by a preset number of steps, and then acquiring a projected picture image again to start re-execution, until the definition value of the current projected picture image is less than the definition value of the previous projected picture image, and then driving the motor to move in the first direction by a preset number of steps, so as to complete thermal defocusing compensation.

Alternatively, the method of S143 comprises:

S1431: the motor is driven to rotate in the first direction by a preset number of steps, and then a projected picture image is acquired again;

S1432: it is determined whether a similarity value between the current projected picture image and the previous projected picture image satisfies a preset similarity value requirement, if not, S11 is returned, and if so, S1433 is proceeded; and S1433: definition values of the current projected picture image and a definition value of the previous projected picture image are calculated, and it is determined whether the definition value of the current projected picture image is greater than or equal to the definition value of the previous projected picture image, if so, S1431 is returned, and if not, the motor is driven to move in the second direction by a preset number of steps, so as complete thermal defocusing compensation.

The method of S144 comprises:

S1441: the motor is driven to rotate in the second direction by a preset number of steps, and then a projected picture image is acquired again;

S1442: it is determined whether a similarity value between the current projected picture image and the previous projected picture image satisfies a preset similarity value requirement, if not, S11 is returned, and if so, S1443 is proceeded; and S1443: definition values of the current projected picture image and a definition value of the previous projected picture image are calculated, and it is determined whether the definition value of the current projected picture image is greater than or equal to the definition value of the previous projected picture image, if so, S1441 is returned, and if not, the motor is driven to move in the first direction by a preset number of steps, so as complete thermal defocusing compensation.

Alternatively, the step of calculating a definition value of the current projected picture image and a definition value of the previous projected picture image comprises:

the current projected picture image is zoomed out, and a difference between the definition value of the current projected picture image and a definition value of the zoomed-out current projected picture image is calculated, as the definition value of the current projected picture image; and the previous projected picture image is zoomed out, and a difference between the definition value of the previous projected picture image and a definition value of the zoomed-out previous projected picture image is calculated, as the definition value of the previous projected picture image.

Some embodiments of the present disclosure also provide a bidirectional compensation apparatus for projection thermal defocusing, comprising:

a first image acquisition module, configured to acquire projected picture images;

a second image acquisition module, configured to drive a motor to rotate in a first direction by a preset number of steps, and then acquire a projected picture image again;

a similarity determination module, configured to determine whether a similarity value between a current projected picture image and a previous projected picture image satisfies a preset similarity value requirement, if not, return to the first image acquisition module, and if so, proceed to a thermal defocusing compensation module; and the thermal defocusing compensation module, configured to calculate a definition value of the current projected picture image and a definition value of the previous projected picture image, and perform first-direction thermal defocusing compensation or second-direction thermal defocusing compensation according to a comparison result of the two definition values.

Alternatively, the first image acquisition module comprises:

an image collection unit, configured to continuously acquire two projected picture images; and an image determination unit, configured to determine whether a similarity value between the two projected picture images satisfies a preset similarity value requirement, if so, proceed to the second image acquisition module, and if not, return to the image collection unit.

Alternatively, the thermal defocusing compensation module comprises:

a definition calculation unit, configured to calculate a definition value of the current projected picture image and a definition value of the previous projected picture image;

a definition determination unit, configured to determine whether the definition value of the current projected picture image is greater than or equal to the definition value of the previous projected picture image, if so, proceed to a first-direction thermal defocusing compensation unit, and if not, proceed to a second-direction thermal defocusing compensation unit;

the first-direction thermal defocusing compensation unit, configured to drive the motor to rotate in the first direction by a preset number of steps, and then acquire a projected picture image again, calculate a definition value of the current projected picture image and a definition value of the previous projected picture image, and determine whether the definition value of the current projected picture image is greater than or equal to the definition value of the previous projected picture image, if so, return to the step of driving the motor to rotate in the first direction by a preset number of steps, and then acquiring a projected picture image again to start re-execution, until the definition value of the current projected picture image is less than the definition value of the previous projected picture image, and then drive the motor to move in a second direction by a preset number of steps, so as to complete thermal defocusing compensation; and the second-direction thermal defocusing compensation unit, configured to drive the motor to rotate in the second direction by a preset number of steps, and then acquire a projected picture image again, calculate a definition value of the current projected picture image and a definition value of the previous projected picture image, and determine whether the definition value of the current projected picture image is greater than or equal to the definition value of the previous projected picture image, if so, return to the step of driving the motor to rotate in the second direction by a preset number of steps, and then acquiring a projected picture image again to start re-execution, until the definition value of the current projected picture image is less than the definition value of the previous projected picture image, and then drive the motor to move in the first direction by a preset number of steps, so as to complete thermal defocusing compensation.

Alternatively, the first-direction thermal defocusing compensation unit comprises:

a first-direction driving component, configured to drive the motor to rotate in the first direction by a preset number of steps, and then acquire a projected picture image again;

a first similarity determination component, configured to determine whether a similarity value between the current projected picture image and the previous projected picture image satisfies a preset similarity value requirement, if not, return to the first image acquisition module, and if so, proceed to a first definition determination component; and a first thermal defocusing compensation component, configured to calculate a definition value of the current projected picture image and a definition value of the previous projected picture image, and determine whether the definition value of the current projected picture image is greater than or equal to the definition value of the previous projected picture image, if so, return to the first-direction driving component, and if not, drive the motor to move in the second direction by a preset number of steps, so as to complete thermal defocusing compensation.

The second-direction thermal defocusing compensation unit comprises:

a second-direction driving component, configured to drive the motor to rotate in the second direction by a preset number of steps, and then acquire a projected picture image again;

a second similarity determination component, configured to determine whether a similarity value between the current projected picture image and the previous projected picture image satisfies a preset similarity value requirement, if not, return to the first image acquisition module, and if so, proceed to a second thermal defocusing compensation component; and the second thermal defocusing compensation component, configured to calculate a definition value of the current projected picture image and a definition value of the previous projected picture image, and determine whether the definition value of the current projected picture image is greater than or equal to the definition value of the previous projected picture image, if so, return to the second-direction driving component, and if not, drive the motor to move in the first direction by a preset number of steps, so as to complete thermal defocusing compensation.

Alternatively, the method of calculating a definition value of the current projected picture image and a definition value of the previous projected picture image comprises:

zooming out the current projected picture image, and calculating a difference between the definition value of the current projected picture image and a definition value of the zoomed-out current projected picture image, as the definition value of the current projected picture image; and zooming out the previous projected picture image, and calculating a difference between the definition value of the previous projected picture image and a definition value of the zoomed-out previous projected picture image, as the definition value of the previous projected picture image.

Some embodiments of the present disclosure also provide a bidirectional compensation apparatus for projection thermal defocusing, comprising:

a memory, configured to store a computer program; and
a processor, configured to execute the computer program to implement the steps of the described bidirectional compensation method for projection thermal defocusing.

Some embodiments of the present disclosure further provide a readable storage medium, wherein the readable storage medium stores a computer program, and when executed by a processor, the computer program implements the steps of the described bidirectional compensation method for projection thermal defocusing.

BRIEF DESCRIPTION OF THE DRAWINGS

To describe the embodiments of the present disclosure more clearly, hereinafter, accompanying drawings requiring to be used in the embodiments are introduced briefly. Apparently, the accompanying drawings in the following description merely relate to some embodiments of the present disclosure, and for a person of ordinary skill in the art, other accompanying drawings can also be derived from these accompanying drawings without involving any inventive effort.

DETAILED DESCRIPTION OF THE EMBODIMENTS

Hereinafter, the technical solutions in the embodiments of the present disclosure will be described clearly and completely with reference to the accompanying drawings in the embodiments of the present disclosure. Obviously, the embodiments as described are only some of the embodiments of the present disclosure, and are not all of the embodiments. All other embodiments obtained by a person of ordinary skill in the art on the basis of the embodiments of the present disclosure without any inventive effort shall all fall within the scope of protection of the present disclosure.

To make a person skilled in the art better understand the solutions of some embodiments of the present disclosure, some embodiments of the present disclosure are further described in detail with reference to the accompanying drawings and specific embodiments.

Figure 1:
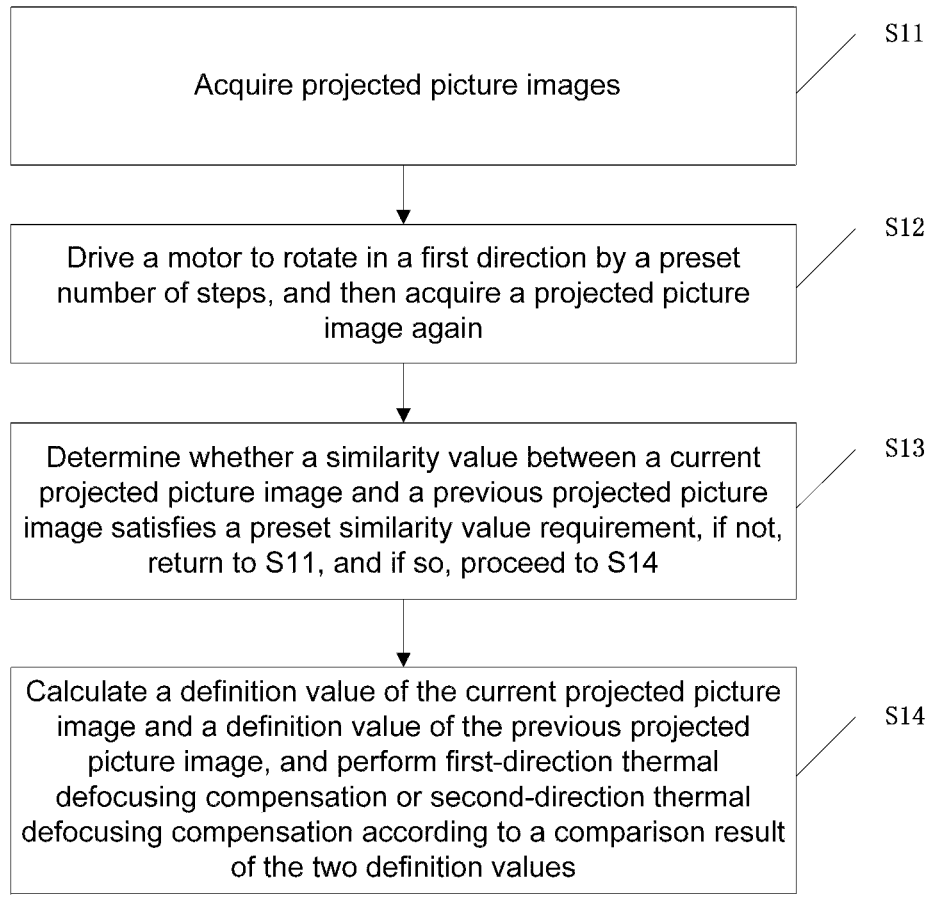
FIG. 1 is a schematic flowchart of a bidirectional compensation method for projection thermal defocusing according to embodiments of the present disclosure.

As shown in FIG. 1, embodiments of the present disclosure provide a bidirectional compensation method for projection thermal defocusing, comprising:

S11: acquiring projected picture images;
S12: driving a motor to rotate in a first direction by a preset number of steps, and then acquiring a projected picture image again;
S13: determining whether a similarity value between a current projected picture image and a previous projected picture image satisfies a preset similarity value requirement, if not, returning to S11, and if so, proceeding to S14; and
S14: calculating a definition value of the current projected picture image and a definition value of the previous projected picture image, and performing first-direction thermal defocusing compensation or second-direction thermal defocusing compensation according to a comparison result of the two definition values.

Compared with the related art, the beneficial effects of some embodiments of the present disclosure are described in detail as follows: the bidirectional compensation method for projection thermal defocusing provided in some embodiments of the present disclosure comprises determining whether to proceed to a definition value determination step according to whether a similarity value of two latest projected picture images satisfies a preset similarity value requirement; by means of the method of proceeding to first-direction thermal defocusing compensation or second-direction thermal defocusing compensation by comparing the magnitude of definition values of the latest two projected picture images, non-perception compensation for projection thermal defocusing is achieved, without using a specified compensation direction and a specific focusing map, and a compensation effect is achieved by means of real-time analysis of projected pictures, the operation being convenient and suitable for widespread popularization.

Specifically, the bidirectional compensation method/apparatus for projection thermal defocusing provided in the embodiments is applicable to a device having a projection function, such as a projection machine, a projector, and a screen-less television, and the device comprises a projection module (an optical machine), a photographing module (a camera) and a control processing module. The projection module projects an image onto a projection surface, the photographing module photographs a projected picture on the projection surface, and the control processing module is used for control, analysis and calculation.

Figure 2:
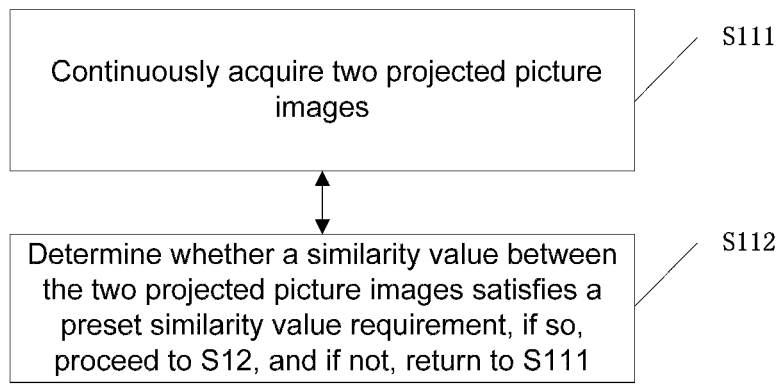
FIG. 2 is a schematic flowchart of a method for acquiring projected picture images according to embodiments of the present disclosure.

As shown in FIG. 2, it should be noted that the method of S11 comprises:
  S111: continuously acquiring two projected picture images; and
  S112: determining whether a similarity value between the two projected picture images satisfies a preset similarity value requirement, if so, proceeding to S12, and if not, returning to S111.

Here, in the technical solutions of some embodiments of the present disclosure, a specific focusing map is not used, and thermal defocusing compensation is completed by means of real-time analysis of projected pictures, and thus whether a current projected picture is stable can be determined first, and if so, proceeding to subsequent steps.

Figure 3:
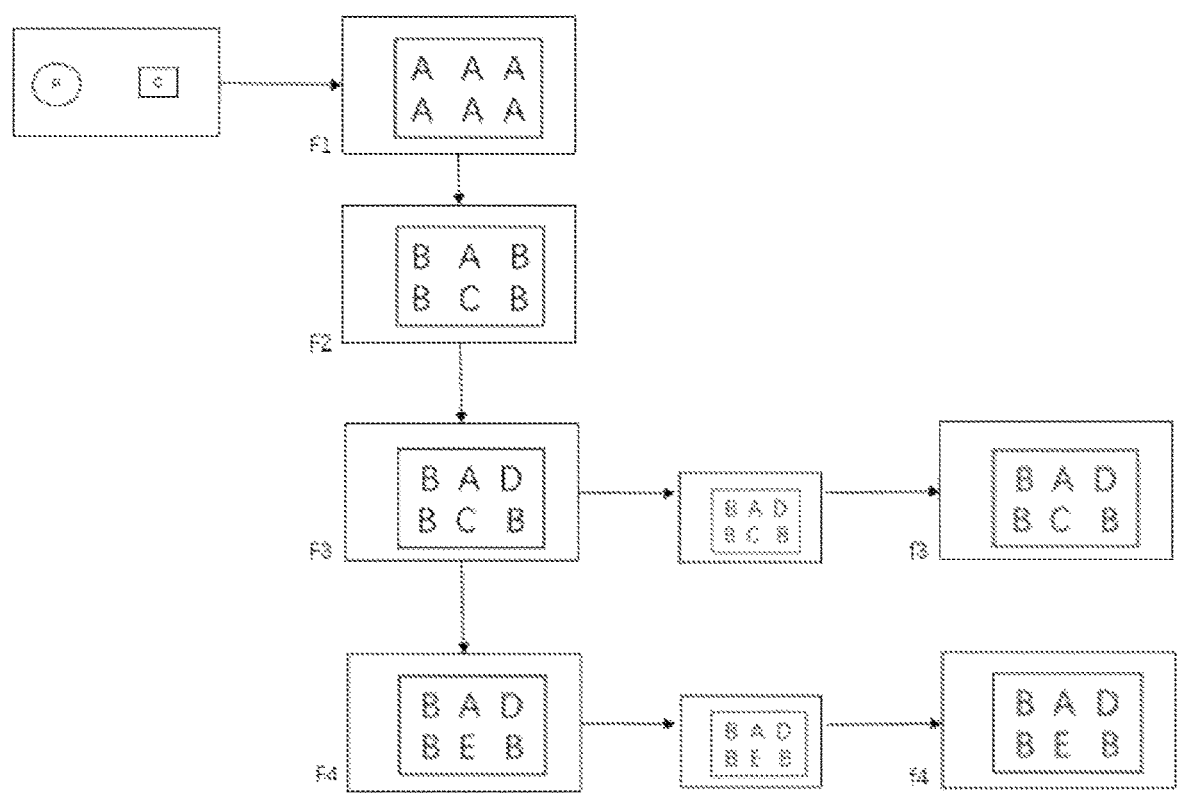
FIG. 3 is a schematic diagram of an example of bidirectional compensation for projection thermal defocusing according to embodiments of the present disclosure.

Specifically, as shown in FIG. 3, in S11, after a thermal defocusing compensation function is triggered, the camera starts a capturing mode to capture a current projected picture, and a projected picture projected by the optical machine is captured by the camera. The camera first captures a projected picture F1 with content of AAAAAA, then immediately captures a projected picture F2 of BABBCB, and then upon analysis, the similar area in the projected pictures F1 and F2 is only A, and the similarity ratio is less than 1/6 (a preset similarity value), then it can be determined that the similarity value of the current projected pictures is relatively low; and next, the camera is called to photograph a projected picture F3 with content of BADBCB, upon analysis, similar areas in F2 and F3 are BA and BCB, and the similarity ratio is higher than 1/6, and then it can be determined that the similarity value of the current projected pictures is relatively high, and the following steps can be entered.

Specifically, in S12 and S13, the motor is driven to move in a focal length-decreasing direction (a preset first direction), and the camera is called to photograph a projected picture F4 with content of BADBEB, then upon analysis, similar areas in F3 and F4 are BADB and B, and the similarity ratio is higher than 1/6, and then it can be determined that the similarity value of the current projected pictures is relatively high, and the following steps can be entered; and if it is determined that the similarity value is relatively low, it indicates that the projected pictures have changed, and thermal defocusing analysis cannot be continued, it is necessary to return to step S11 to re-search an appropriate opportunity to perform thermal defocusing compensation. Here, the first direction may be set as a focal length-decreasing direction, and a corresponding second direction is a focal length-increasing direction; and the first direction may also be set as a focal length-increasing direction, and the corresponding second direction is a focal length-decreasing direction, which can be set according to experiences or actual situations.

Specifically, each time the camera collects a projected picture image, the system performs a storage action, and therefore the current projected picture image and the previous projected picture image mentioned in some embodiments of the present disclosure both refer to two latest collected and stored projected picture images. The method for calculating a similarity value between two projected picture images may use SSIM parameters:

$$SSIM(x, y) = \frac{(2\mu_x\mu_y + C_1)(2\sigma_x\sigma_y + C_2)}{(\mu_x^2 + \mu_y^2 + C_1)(\sigma_x^2 + \sigma_y^2 + C_2)}$$

where $\mu_x$ and $\mu_y$ represent mean values of the two projected picture images, $\sigma_x^2$ and $\sigma_y^2$ represent a variance between the two projected picture images, $\sigma_x\sigma_y$ represents a joint variance of the two projected picture images, and $C_1$ and $C_2$ are empirical parameters. By means of the SSIM parameters, the similarity value of the two projected picture images can be obtained, wherein the greater the value is, the more similar the images are; and by means of the described method, the similarity value of two latest collected projected picture images is quickly calculated.

Figure 4:
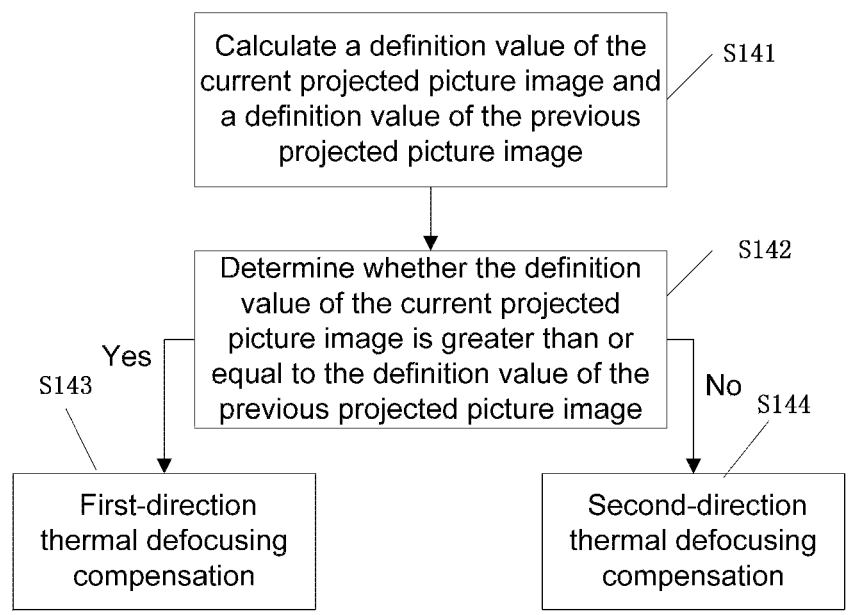
FIG. 4 is a schematic flowchart of a thermal defocusing adjustment method according to embodiments of the present disclosure.

As shown in FIG. 4, it, should be noted that the method of S14 comprises:
  S141: calculating a definition value of the current projected picture image and a definition value of the previous projected picture image;
  S142: determining whether the definition value of the current projected picture image is greater than or equal to the definition value of the previous projected picture image, if so, proceeding to S143, and if not, proceeding to S144;
  S143: first-direction thermal defocusing compensation: driving the motor to rotate in the first direction by a preset number of steps, and then acquiring a projected picture image again, calculating a definition value of the current projected picture image and a definition value of the previous projected picture image, and determining whether the definition value of the current projected picture image is greater than or equal to the definition value of the previous projected picture image, if so, returning to the step of driving the motor to rotate in the first direction by a preset number of steps, and then acquiring a projected picture image again to start re-execution, until the definition value of the current projected picture image is less than the definition value of the previous projected picture image, and then driving the motor to move in a second direction by a preset number of steps, so as to complete thermal defocusing compensation; and
  S144: second-direction thermal defocusing compensation: driving the motor to rotate in the second direction by a preset number of steps, and then acquiring a projected picture image again, calculating a definition value of the current projected picture image and a definition value of the previous projected picture image, and determining whether the definition value of the current projected picture image is greater than or equal to the definition value of the previous projected picture image, if so, return to the step of driving the motor to rotate in the second direction by a preset number of steps, and then acquiring a projected picture image again to start re-execution, until the definition value of the current projected picture image is less than the definition value of the previous projected picture image, and then driving the motor to move in the first direction by a preset number of steps, so as to complete thermal defocusing compensation.

Figure 5A:
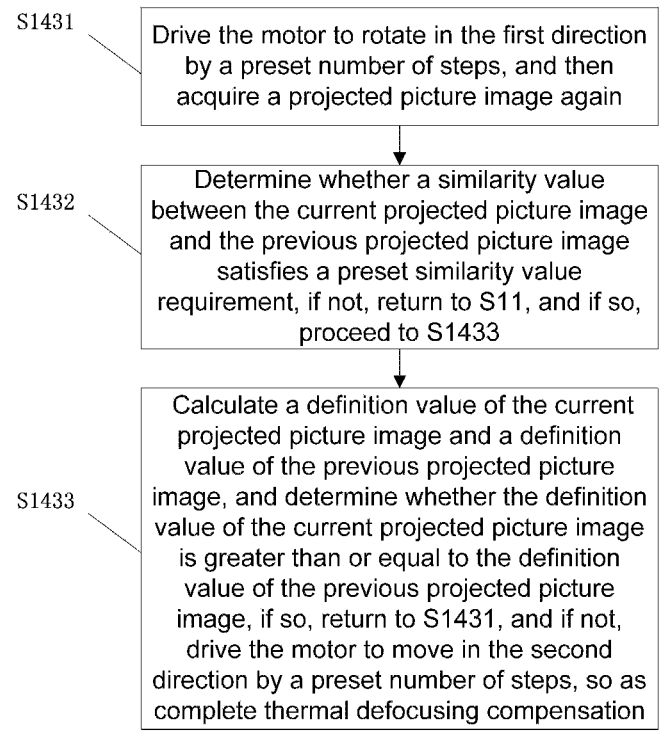
FIG. 5a relates to schematic flowcharts of a first-direction thermal defocusing compensation method according to embodiments of the present disclosure.

As shown in FIG. 5a, it should be noted that the method of S143 comprises:

S1431: driving the motor to rotate in the first direction by a preset number of steps, and then acquiring a projected picture image again;

S1432: determining whether a similarity value between the current projected picture image and the previous projected picture image satisfies a preset similarity value requirement, if not, returning to S11, and if so, proceeding to S1433; and S1433: calculating a definition value of the current projected picture image and a definition value of the previous projected picture image, and determining whether the definition value of the current projected picture image is greater than or equal to the definition value of the previous projected picture image, if so, returning to S1431, and if not, driving the motor to move in the second direction by a preset number of steps, so as complete thermal defocusing compensation.

Figure 5B:
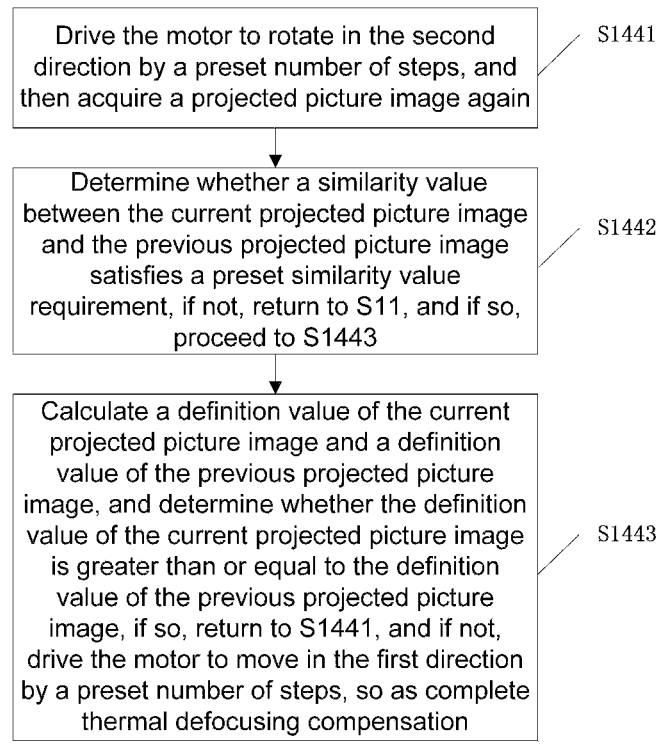
FIG. 5b relates to schematic flowcharts of a second-direction thermal defocusing compensation method according to embodiments of the present disclosure.

As shown in FIG. 5b, the method of S144 comprises:

S1441: driving the motor to rotate in the second direction by a preset number of steps, and then acquiring a projected picture image again;

S1442: determining whether a similarity value between the current projected picture image and the previous projected picture image satisfies a preset similarity value requirement, if not, returning to S11, and if so, proceeding to S1443; and S1443: calculating a definition value of the current projected picture image and a definition value of the previous projected picture image, and determining whether the definition value of the current projected picture image is greater than or equal to the definition value of the previous projected picture image, if so, returning to S1441, and if not, driving the motor to move in the first direction by a preset number of steps, so as complete thermal defocusing compensation.

Figure 6:
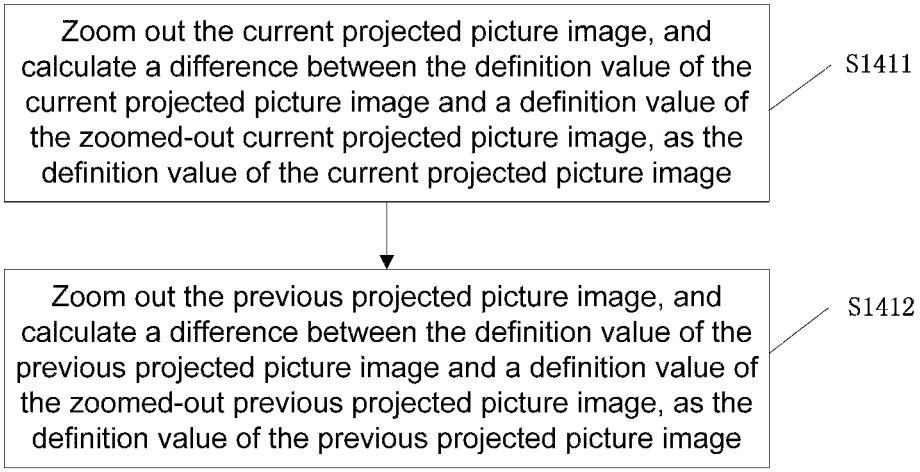
FIG. 6 is a schematic flowchart of a method for calculating definition values of two projected picture images according to embodiments of the present disclosure.

As shown in FIG. 6, it should be noted that the method of calculating a definition value of the current projected picture image and a definition value of the previous projected picture image comprises:

S1411: zooming out the current projected picture image, and calculating a difference between the definition value of the current projected picture image and a definition value of the zoomed-out current projected picture image, as the definition value of the current projected picture image; and S1412: zooming out the previous projected picture image, and calculating a difference between the definition value of the previous projected picture image and a definition value of the zoomed-out previous projected picture image, as the definition value of the previous projected picture image.

Specifically, in practical application scenarios, when directly comparing F3 and F4, there is a large calculation amount and a large difficulty, and in cases where the projected picture is a video, it is difficult to match pixel points one by one to compare the definitions of images. Therefore, F3 and F4 can be processed to reduce the sizes of F3 and F4, respectively, to obtain f3 and f4. F3 is clearer than F4, and after size change, the definition information of F3 will be lost more than F4, and thus Cal(F3)−Cal(f3)>Cal(F4)−Cal(f4), that is, the definition change value from F3 to f3 is greater than the definition change value from F4 to f4, and in this way, the definition values can be self-compared without direct comparison using F3 and F4, and after the size reduction, the definition situations of F3 and F4 can be compared by the described process. Specifically, a method for comparison by separately extracting four areas, i.e. B, D, B, B, comprises: performing similarity analysis on the image in areas, obtaining that four areas B, D, B, B satisfy a similarity requirement, and respectively performing scale reduction on the areas B, D, B, B, then performing scale reduction, and comparing the differences of definitions of the four areas, if the definitions of three or more areas lose less, it means that the current picture is defocusing, and if the definitions of three or more areas lose more, it means that the current picture is not defocusing.

Specifically, after the motor is driven to rotate in the first direction by a preset number of steps (one or more steps), similarity determination is performed, when the similarity determination is passed, definition determination is performed, and when the definition determination is passed, that is, the definition value of the current projected picture image is greater than or equal to the definition value of the previous projected picture image, then, the described steps are repeated, and then after the motor is driven to rotate in the first direction by a preset number of steps, the similarity determination and the definition determination are performed, and if passing, the described steps are still continuously repeated until the definition determination fails, that is, the definition value of the current projected picture image is less than the definition value of the previous projected picture image, it indicates that the previous position of the motor is the final focusing position, and the motor needs to be driven to rotate in the second direction, that is, the motor is rotated in an opposite direction by a preset number of steps, to complete thermal defocusing compensation. If the similarity determination is not passed, it indicates that the projected picture has changed and thermal defocusing adjustment cannot be continued, and the process returns to S11 for re-execution.

Correspondingly, after the motor is driven to rotate in the first direction by a preset number of steps (one or more steps), similarity determination is performed, when the similarity determination is passed, definition determination is performed, and when the definition determination is not passed, that is, the definition value of the current projected picture image is less than the definition value of the previous projected picture image, it indicates that the direction of the first rotation is opposite, the definition is deteriorated, and then the driving direction is adjusted, the motor is driven to rotate in the second direction by a preset number of steps (one or more steps), similarity determination and definition determination are performed, and if both are passed, the motor is driven to rotate in the second direction by a preset number of steps (one or more steps), then the similarity determination and the definition determination are performed, and the described steps are repeated until the definition determination fails, that is, the definition value of the current projected picture image is less than the definition value of the previous projected picture image, it indicates that the previous position of the motor is the final focusing position, and the motor needs to be driven to rotate in the first direction, that is, the motor is rotated in an opposite direction by a preset number of steps, to complete thermal defocusing compensation. If the similarity determination is not passed, it indicates that the projected picture has changed and thermal defocusing adjustment cannot be continued, and the process returns to S11 for re-execution.

By means of the described steps, bidirectional non-perception thermal defocusing compensation for any projected pictures can be achieved, and a compensation effect can be achieved only by real-time analysis of projected pictures without using a specified compensation direction and a specific focusing map, the operation being convenient and suitable for widespread popularization.

Figure 7:
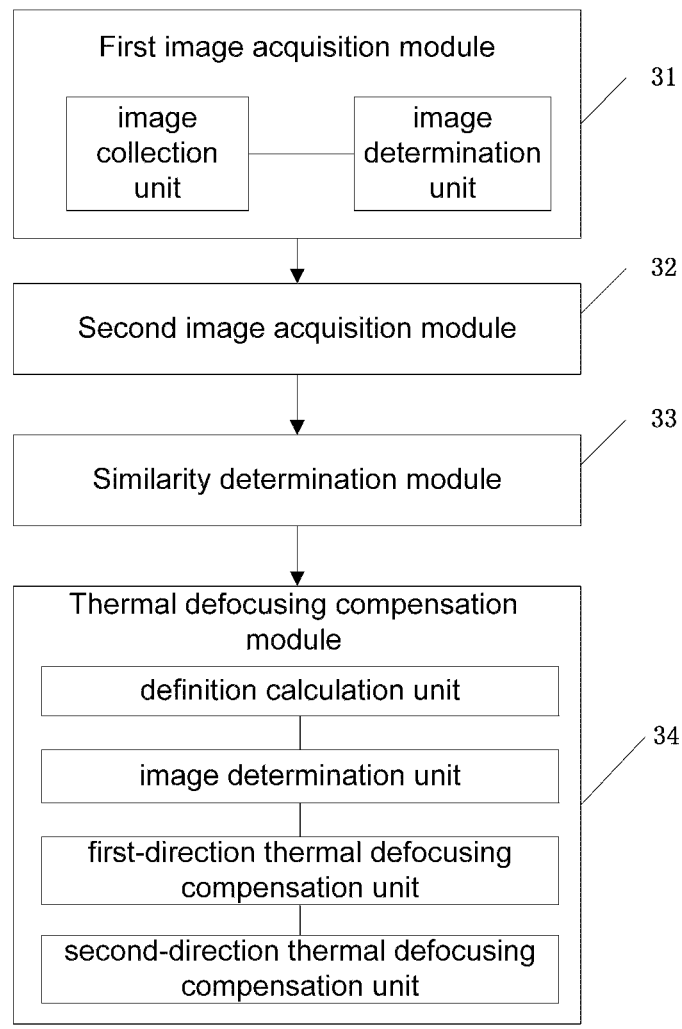
FIG. 7 is a schematic structural diagram of a bidirectional compensation apparatus for projection thermal defocusing according to embodiments of the present disclosure.
Figure 8:
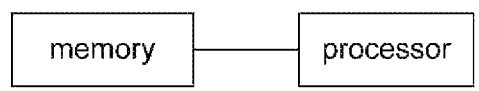
FIG. 8 is a schematic structural diagram of another bidirectional compensation apparatus for projection thermal defocusing according to embodiments of the present disclosure.
Figure 9:
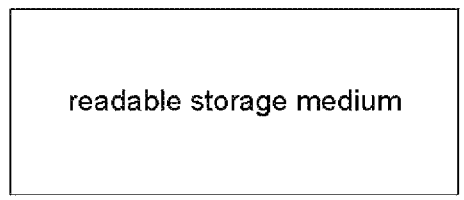
FIG. 9 is a schematic structural diagram of a readable storage medium according to embodiments of the present disclosure.

As shown in FIG. 7, embodiments of the present disclosure further provide a bidirectional compensation apparatus for projection thermal defocusing, comprising:
  a first image acquisition module 31, configured to acquire projected picture images;
  a second image acquisition module 32, configured to drive a motor to rotate in a first direction by a preset number of steps, and then acquire a projected picture image again;
  a similarity determination module 33, configured to determine whether a similarity value between a current projected picture image and a previous projected picture image satisfies a preset similarity value requirement, if not, return to the first image acquisition module, and if so, proceed to a thermal defocusing compensation module; and
  the thermal defocusing compensation module 34, configured to calculate a definition value of the current projected picture image and a definition value of the previous projected picture image, and perform first-direction thermal defocusing compensation or second-direction thermal defocusing compensation according to a comparison result of the two definition values.

It should be noted that the first image acquisition module 31 comprises:
  an image collection unit, configured to continuously acquire two projected picture images; and
  an image determination unit, configured to determine whether a similarity value between the two projected picture images satisfies a preset similarity value requirement, if so, proceed to the second image acquisition module, and if not, return to the image collection unit.

It should be noted that the thermal defocusing compensation module 34 comprises:
  a definition calculation unit, configured to calculate a definition value of the current projected picture image and a definition value of the previous projected picture image;
  a definition determination unit, configured to determine whether the definition value of the current projected picture image is greater than or equal to the definition value of the previous projected picture image, if so, proceed to a first-direction thermal defocusing compensation unit, and if not, proceed to a second-direction thermal defocusing compensation unit;
  the first-direction thermal defocusing compensation unit, configured to drive the motor to rotate in the first direction by a preset number of steps, and then acquire a projected picture image again; calculate a definition value of the current projected picture image and a definition value of the previous projected picture image, and determine whether the definition value of the current projected picture image is greater than or equal to the definition value of the previous projected picture image, if so, return to the step of driving the motor to rotate in the first direction by a preset number of steps, and then acquiring a projected picture image again to start re-execution, until the definition value of the current projected picture image is less than the definition value of the previous projected picture image, and then driving the motor to move in a second direction by a preset number of steps, so as to complete thermal defocusing compensation; and
  the second-direction thermal defocusing compensation unit, configured to drive the motor to rotate in the second direction by a preset number of steps, and then acquire a projected picture image again, calculate a definition value of the current projected picture image and a definition value of the previous projected picture image, and determine whether the definition value of the current projected picture image is greater than or equal to the definition value of the previous projected picture image, if so, return to the step of driving the motor to rotate in the second direction by a preset number of steps, and then acquiring a projected picture image again to start re-execution, until the definition value of the current projected picture image is less than the definition value of the previous projected picture image, and then drive the motor to move in the first direction by a preset number of steps, so as to complete thermal defocusing compensation.

It should be noted that the first-direction thermal defocusing compensation unit comprises:
  a first-direction driving component, configured to drive the motor to rotate in the first direction by a preset number of steps, and then acquire a projected picture image again;
  a first similarity determination component, configured to determine whether a similarity value between the current projected picture image and the previous projected picture image satisfies a preset similarity value requirement, if not, return to the first image acquisition module, and if so, proceed to a first definition determination component; and
  a first thermal defocusing compensation component, configured to calculate a definition value of the current projected picture image and a definition value of the previous projected picture image, and determine whether the definition value of the current projected picture image is greater than or equal to the definition value of the previous projected picture image, if so, return to the first-direction driving component, and if not, drive the motor to move in the second direction by a preset number of steps, so as to complete thermal defocusing compensation.

The second-direction thermal defocusing compensation unit comprises:
  a second-direction driving component, configured to drive the motor to rotate in the second direction by a preset number of steps, and then acquire a projected picture image again;
  a second similarity determination component, configured to determine whether a similarity value between the current projected picture image and the previous projected picture image satisfies a preset similarity value requirement, if not, return to the first image acquisition module, and if so, proceed to a second thermal defocusing compensation component; and the second thermal defocusing compensation component, configured to calculate a definition value of the current projected picture image and a definition value of the previous projected picture image, and determine whether the definition value of the current projected picture image is greater than or equal to the definition value of the previous projected picture image, if so, return to the second-direction driving component, and if not, drive the motor to move in the first direction by a preset number of steps, so as to complete thermal defocusing compensation.

It should be noted that the method of calculating a definition value of the current projected picture image and a definition value of the previous projected picture image comprises:

zooming out the current projected picture image, and calculating a difference between the definition value of the current projected picture image and a definition value of the zoomed-out current projected picture image, as the definition value of the current projected picture image; and zooming out the previous projected picture image, and calculating a difference between the definition value of the previous projected picture image and a definition value of the zoomed-out previous projected picture image, as the definition value of the previous projected picture image.

Embodiments of the present disclosure also provide a bidirectional compensation apparatus for projection thermal defocusing, comprising:

a memory, configured to store a computer program; and
a processor, configured to execute the computer program to implement the steps of the described bidirectional compensation method for projection thermal defocusing.

Some embodiments of the present disclosure further provide a readable storage medium, wherein the readable storage medium stores a computer program, and when executed by a processor, the computer program implements the steps of the described bidirectional compensation method for projection thermal defocusing.

For description of features in the embodiment corresponding to FIG. 7, reference may be made to related description of the embodiments corresponding to FIG. 1 to FIG. 6, and details are not repeated herein.

The bidirectional compensation method and apparatus for projection thermal defocusing and readable storage medium provided by the embodiments of the present disclosure are introduced in detail above. The embodiments in the description are described in a progressive manner. Each embodiment focuses on differences from other embodiments. For the same similar parts among the embodiments, reference may be made to each other. For the apparatus disclosed in the embodiments, as the apparatus corresponds to the method disclosed in the embodiments, the illustration thereof is relatively simple, and for the relevant parts, reference can be made to the illustration of the method part. It should be noted that for a person of ordinary skill in the art, several modifications and improvements can be made to some embodiments of the present disclosure without departing from the principle of some embodiments of the present disclosure. These improvements and modifications also fall within the scope of protection of the claims of the present disclosure.

A person skilled in the art may further appreciate that units and algorithm steps in examples described in combination with the embodiments disclosed herein can be achieved in the form of electronic hardware, computer software, or a combination of the two. To clearly describe the interchangeability between the hardware and the software, the foregoing has generally described compositions and steps of each example according to functions. Whether these functions are executed by hardware or software depends on specific applications and design constraint conditions of the technical solutions. A person skilled in the art may use different methods to implement the described functions for each particular application, but the implementation shall not be considered to go beyond the scope of some embodiments of the present disclosure.

The steps of the method or algorithm described in conjunction with the embodiments disclosed herein may also be directly implemented by hardware, by a software module executed by a processor, or by a combination thereof. The software module may be placed in a random access memory (RAM), a memory, a read-only memory (ROM), an electrically programmable ROM, an electrically erasable programmable ROM, a register, a hard disk, a removable disk, a CD-ROM, or storage media in any other forms known in the present technical field.

What is claimed is:

1. A bidirectional compensation method for projection thermal defocusing, comprising:
   S11: acquiring projected picture images;
   S12: driving a motor to rotate in a first direction by a preset number of steps, and then acquiring a projected picture image again;
   S13: determining whether a similarity value between a current projected picture image and a previous projected picture image satisfies a preset similarity value requirement, in a case that the similarity value does not satisfy a preset similarity value requirement, returning to S11, and in a case that the similarity value satisfies a preset similarity value requirement, proceeding to S14; and
   S14: calculating definition values of the current projected picture image and a definition value of the previous projected picture image, and performing first-direction thermal defocusing compensation or second-direction thermal defocusing compensation according to a comparison result of two definition values which comprises a definition value of the current projected picture image and a definition value of the previous projected picture image;
   wherein S14 comprises: S141: calculating the definition values of the current projected picture image and the definition value of the previous projected picture image; S142: determining whether the definition value of the current projected picture image is greater than or equal to the definition value of the previous projected picture image, in a case that the definition value of the current projected picture image is greater than or equal to the definition value of the previous projected picture image, proceeding to S143, and in a case that the definition value of the current projected picture image is not greater than or equal to the definition value of the previous projected picture image, proceeding to S144; S143: performing first-direction thermal defocusing compensation: driving the motor to rotate in the first direction by the preset number of steps, and then acquiring a projected picture image again, calculating a definition value of the current projected picture image and a definition value of the previous projected picture image, and determining whether the definition value of the current projected picture image is greater than or equal to the definition value of the previous projected picture image, in a case that the definition value of the current projected picture image is greater than or equal to the definition value of the previous projected picture image, returning to the step of driving the motor to rotate in the first direction by the preset number of steps, and then acquiring a projected picture image again to start re-execution, until the definition value of the current projected picture image is less than the definition value of the previous projected picture image, and then driving the motor to move in the second direction by the preset number of steps, so as to complete thermal defocusing compensation; and S144: performing second-direction thermal defocusing compensation; driving the motor to rotate in the second direction by the preset number of steps, and then acquiring a projected picture image again, calculating a definition value of the current projected picture image and a definition value of the previous projected picture image, and determining whether the definition value of the current projected picture image is greater than or equal to the definition value of the previous projected picture image, in a case that the definition value of the current projected picture image is greater than or equal to the definition value of the previous projected picture image, returning to the step of driving the motor to rotate in the second direction by the preset number of steps, and then acquiring a projected picture image again to start re-execution, until the definition value of the current projected picture image is less than the definition value of the previous projected picture image, and then driving the motor to move in the first direction by a preset number of steps, so as to complete thermal defocusing compensation.

2. The bidirectional compensation method for projection thermal defocusing as claimed in claim 1, S11 comprises:
   S111: continuously acquiring two projected picture images; and
   S112: determining whether a similarity value between the two projected picture images satisfies the preset similarity value requirement, in a case that the similarity value between the two projected picture images satisfies the preset similarity value requirement, proceeding to S12: driving a motor to rotate in a first direction by a preset number of steps, and then acquiring a projected picture image again and in a case that the similarity value between the two projected picture images does not satisfy the preset similarity value requirement, returning to S111: continuously acquiring two projected picture images.

3. The bidirectional compensation method for projection thermal defocusing as claimed in claim 2, wherein the step of calculating the definition values of the current projected picture image and the definition value of the previous projected picture image comprises:
   zooming out the current projected picture image, and calculating a difference between the definition value of the current projected picture image and a definition value of a zoomed-out current projected picture image, as the definition value of the current projected picture image; and
   zooming out the previous projected picture image, and calculating a difference between the definition value of the previous projected picture image and a definition value of the zoomed-out previous projected picture image, as the definition value of the previous projected picture image.

4. The bidirectional compensation method for projection thermal defocusing as claimed in claim 1, wherein the step of calculating the definition values of the current projected picture image and the definition value of the previous projected picture image comprises:
   zooming out the current projected picture image, and calculating a difference between the definition value of the current projected picture image and a definition value of a zoomed-out current projected picture image, as the definition value of the current projected picture image; and
   zooming out the previous projected picture image, and calculating a difference between the definition value of the previous projected picture image and a definition value of the zoomed-out previous projected picture image, as the definition value of the previous projected picture image.

5. A bidirectional compensation apparatus for projection thermal defocusing, comprising:
   a memory, configured to store a computer program; and
   a processor, configured to execute the computer program to implement the steps of the bidirectional compensation method for projection thermal defocusing as claimed in claim 1.

6. A readable storage medium, wherein the readable storage medium stores a computer program, and when executed by a processor, the computer program implements the steps of the bidirectional compensation method for projection thermal defocusing as claimed in claim 1.

7. A bidirectional compensation apparatus for projection thermal defocusing, comprising:
   a first image acquisition module, configured to acquire projected picture images;
   a second image acquisition module, configured to drive a motor to rotate in a first direction by a preset number of steps, and then acquire a projected picture image again;
   a similarity determination module, configured to determine whether a similarity value between a current projected picture image and a previous projected picture image satisfies a preset similarity value requirement, in a case that the similarity value does not satisfy a preset similarity value requirement, return to the first image acquisition module, and in a case that the similarity value satisfies a preset similarity value requirement, proceed to a thermal defocusing compensation module; and
   the thermal defocusing compensation module, configured to calculate definition values of the current projected picture image and a definition value of the previous projected picture image, and perform first-direction thermal defocusing compensation or second-direction thermal defocusing compensation according to a comparison result of two definition values which comprises a definition value of the current projected picture image and a definition value of the previous projected picture image;
   wherein the thermal defocusing compensation modules comprises: a definition calculation unit, configured to calculate the definition values of the current projected picture image and a definition value of the previous projected picture image; a definition determination unit, configured to determine whether the definition value of the current projected picture image is greater than or equal to the definition value of the previous projected picture image, in a case that the definition value of the current projected picture image is greater than or equal to the definition value of the previous projected picture image, proceed to a first-direction thermal defocusing compensation unit, and in a case that the definition value of the current projected picture image is not greater than or equal to the definition value of the previous projected picture image, proceed to a second-direction thermal defocusing compensation unit; the first-direction thermal defocusing compensation unit, configured to drive the motor to rotate in the first direction by the preset number of steps, and then acquire a projected picture image again; calculate a definition value of the current projected picture image and a definition value of the previous projected picture image, and determine whether the definition value of the current projected picture image is greater than or equal to the definition value of the previous projected picture image, in a case that the definition value of the current projected picture image is greater than or equal to the definition value of the previous projected picture image, return to a step of driving the motor to rotate in the first direction by the preset number of steps, and then acquiring a projected picture image again to start re-execution, until the definition value of the current projected picture image is less than the definition value of the previous projected picture image, and then drive the motor to move in a second direction by a preset number of steps, so as to complete thermal defocusing compensation; and the second-direction thermal defocusing compensation unit, configured to drive the motor to rotate in the second direction by a preset number of steps, and then acquire a projected picture image again, calculate a definition value of the current projected picture image and a definition value of the previous projected picture image, and determine whether the definition value of the current projected picture image is greater than or equal to the definition value of the previous projected picture image, in a case that the definition value of the current projected picture image is greater than or equal to the definition value of the previous projected picture image, return to the step of driving the motor to rotate in the second direction by a preset number of steps, and then acquiring a projected picture image again to start re-execution, until the definition value of the current projected picture image is less than the definition value of the previous projected picture image, and then drive the motor to move in the first direction by a preset number of steps, so as to complete thermal defocusing compensation.

8. The bidirectional compensation apparatus for projection thermal defocusing as claimed in claim 7, wherein the first image acquisition module comprises:
an image collection unit, configured to continuously acquire two projected picture images; and
an image determination unit, configured to determine whether a similarity value between the two projected picture images satisfies a preset similarity value requirement, in a case that the similarity value between the two projected picture images satisfies the preset similarity value requirement, proceed to the second image acquisition module, and in a case that the similarity value between the two projected picture images does not satisfy the preset similarity value requirement, return to the image collection unit.

9. The bidirectional compensation apparatus for projection thermal defocusing as claimed in claim 8, wherein the step of calculating the definition value of the current projected picture image and the definition value of the previous projected picture image comprises:
zooming out the current projected picture image, and calculating a difference between the definition value of the current projected picture image and a definition value of the zoomed-out current projected picture image, as the definition value of the current projected picture image; and
zooming out the previous projected picture image, and calculating a difference between the definition value of the previous projected picture image and a definition value of the zoomed-out previous projected picture image, as the definition value of the previous projected picture image.

10. The bidirectional compensation apparatus for projection thermal defocusing as claimed in claim 7, wherein the step of calculating the definition value of the current projected picture image and the definition value of the previous projected picture image comprises:
zooming out the current projected picture image, and calculating a difference between the definition value of the current projected picture image and a definition value of the zoomed-out current projected picture image, as the definition value of the current projected picture image; and
zooming out the previous projected picture image, and calculating a difference between the definition value of the previous projected picture image and a definition value of the zoomed-out previous projected picture image, as the definition value of the previous projected picture image.

* * * * *